United States Patent Office 3,033,824
Patented May 8, 1962

3,033,824
POLYESTERS MODIFIED WITH DIFUNCTIONAL SULFO-AROMATIC COMPOUND, CHAIN TERMINATING AGENTS, AND CHAIN BRANCHING AGENTS, AND PROCESS FOR PRODUCING SAME
William A. H. Huffman, Decatur, Ala., assignor to The Chemstrand Corporation, Decatur, Ala., a corporation of Delaware
No Drawing. Filed Nov. 4, 1957, Ser. No. 694,121
9 Claims. (Cl. 260—75)

This invention relates to new and improved high molecular weight modified polyesters. More particularly this invention relates to fiber-forming modified polyesters having improved dyeability and affinity for both dispersed dyes and basic dyes, and to methods for making said modified polyesters.

Polymeric linear polyesters are readily prepared by heating together dihydric alcohols or functional derivatives thereof and dibasic carboxylic acids or polyester-forming derivatives thereof such as acid halides, salts, or simple esters of volatile alcohols. Highly polymerized poyesters can be formed into filaments, fibers, films and the like which can be permanently oriented. The most widely known and most important commercially of the polymeric polyesters is that prepared by the condensation of terephthalic acid or dimethyl terephthalate and ethylene glycol. These polyester materials in drawn fiber or filament form cannot be satisfactorily dyed by the ordinary dyeing procedures used in dyeing cotton, wool, natural silk, and regenerated cellulose. It is recognized that unless the fiber-forming polyesters can be readily dyed by commercial dyeing processes, the utility of the polymer in the textile field will be limited. The compact structure of polyethylene terephthalate fibers, the molecules of which are closely packed along the axis of the fiber, makes it quite difficult, except with a limited number of dyes, and under extreme conditions of temperature and pressure, to obtain a satisfactory degree of dyebath exhaustion, or to secure satisfactory deep shades in the fibers. Absorption and penetration of the dye into the fiber core are limited by inherent properties of the fiber.

A number of methods have been proposed to increase the dyeability of the polyesters and particularly polyethylene terephthalate. However, the methods proposed to date have not proved to be entirely satisfactory.

Modification of the polyesters by incorporating dye sites in the polymers by selected comonomers ordinarily does not produce satisfactory fiber-forming materials, i.e., the dye affinity may be enhanced but other physical properties such as tenacity, melting point and the like are adversely affected. Accordingly, the art has striven for means to increase the dyeability of polyester structures, such as fibers, filaments, films, and the like without adversely affecting other necessary physical properties.

One method used successfully to improve the dye affinity of polesters for dispersed acetate dyes and basic dyes is to conduct the polyester reaction in the presence of a small amount of a difunctional agent which possesses a sulfonic acid group or sulfonic acid forming group and two functional or reactive groups such as hydroxyl or carboxyl and esters thereof. By this novel technique, modified polyesters can be produced which not only possess improved dye affinity for dispersed acetate dyes and may be dyed with basic dyes under temperature and pressure or with carriers, but also, the modified polyesters have the necessary molecular weight required for fiber-forming polyesters and excellent physical properties in fiber form. Useful agents for this purpose are disclosed in my copending application Serial No. 694,115, filed November 4, 1957, now abandoned. While these improved polyesters are valuable, it is desirable to have polyesters with more versatile dye affinity.

It is a general object of this invention to provide improved and modified high molecular weight fiber-forming polyesters which have improved dyeing characteristics including increased affinity for dyestuffs, and particularly for the dispersed acetate dyestuffs and basic dyestuffs, which polyesters also have a useful balance of other desirable physical properties including high melting points and tenacity. It is a further object of this invention to provide modified polyesters which are readily dyed with basic dyes without requiring carriers or high temperature and pressure. It is another object of this invention to provide a new and improved process for preparing modified polyesters. Other objects and advantages of the invention will be apparent from the description thereof which follows.

I have now discovered a novel and improved class of modified high molecular weight fiber-forming polyesters and methods for making the same which realize the objects of this invention. The objects of this invention are attained by modifying polyesters obtained from dihydric alcohols or functional derivatives thereof and dibasic carboxylic acids or polyester forming derivatives thereof such as acid halides, salts, or simple esters of volatile alcohols, by having present as essential components of the reaction mixture to prepare the polyesters, a difunctional aromatic compound possessing a sulfonic acid group, its salts, esters, or amides and salts thereof, and two other functional or reactive groups which may be hydroxyl or carboxyl and esters thereof, carbonyl and the like, which will react with polyester forming ingredients under polyesterification reaction conditions; a monohydric polyalkylene oxide or hydroxyl polyalkylvinyl ethers; and at least one additional compound such as a polyol having more than two functional groups such as hydroxyl or esters thereof, as will be set forth more fully hereinafter. Such modified polyesters have improved color and are readily melt spun and drawn to yield strong fibers. The drawn fibers are readily dyed to deep shades with both dispersed acetate dyestuffs and basic dyestuffs without the need for high temperature and pressure and other expensive techniques. The dyed fibers so prepared have excellent fastness and retain dye very well under both wet washing and dry cleaning conditions. This invention includes modification of polyesters prepared from bis-betahydroxyalkyl terephthalates or isophthalates regardless of how this reactive intermediate is prepared. The attainment of the objects of this invention by means of the modified polyesters is unexpected since it has been found that copolymers normally formed from dimethyl terephthalate, ethylene glycol and difunctional modifiers containing acidic groupings yield fibers which are brittle, and which, normally, in fiber form, fuse or are appreciably altered by dyeing in dye baths at the boiling point of water.

The glycols employed in the preparation of the modified polyesters of this invention may be any glycol containing from 2 to 10 carbon atoms or polyester-forming derivatives thereof, and more preferably are polymethylene glycols of the general formula $$HO(CH_2)_nOH$$ 

wherein $n$ is an integer from 2 to 10. Ethylene glycol is found particularly useful in preparing the modified polyesters of this invention. At least about one molar proportion of the glycol per molar proportion of dibasic dicarboxylic acid or esters thereof is employed. Generally, however, high proportions of the glycol relative to the esters or acids are used. For example, up to five and as high as ten mols of glycol per mol of dibasic acids or esters are employed because the initial interchange reaction takes place more readily in the presence of an excess of ethylene glycol.

The dicarboxylic acids or polyester-forming derivatives thereof may be of any of those employed by those skilled in the art to make fiber-forming polyesters but more preferably are aromatic dibasic dicarboxylic acids or dialkyl esters thereof. Of particular value in preparing the modified polyesters of this invention is terephthalic acid and dialkyl esters thereof such as dimethyl terephthalate and similar dialkyl esters wherein the alkyl groups are the same or different alkyl radicals, preferably alkyl hydrocarbon radicals containing 1 to 5 carbon atoms thereof. Isophthalic acid and its dialkyl esters also may be employed to make the modified polyesters of this invention. Other useful aromatic dicarboxylic acids or esters thereof which may be used include p,p'-dicarboxy diphenyl, naphthalene dicarboxylic acids such as 2,6-dicarboxy naphthalene; p,p'-dicarboxy diphenylsulfone, p,p'-dicarboxyphenoxyethane and the like. Aliphatic dicarboxylic acids such as adipic, succinic, sebacic and the like may be substituted in part for the aryl dicarboxylic acids. Longer chain aliphatic dicarboxylic acid esters such as dimethyl 1,20-eicosane dioate and the like may be substituted in part for the aryl dicarboxylic acids or esters, to the extent of about 30 percent, to provide further improved products in accordance with this invention.

Copolyesters can also be modified in accordance with the present invention and the modified copolymers exhibit increased dye-receptivity. For example, the copolyesters formed by the reaction of a glycol, as hereinbefore defined, and two or more aromatic dicarboxylic acids or dialkyl esters thereof, or by the reaction of two or more glycols with one or two or more acids or dialkyl esters thereof. Of particular utility is the copolyester formed by the reaction of dimethyl terephthalate, dimethyl isophthalate, ethylene glycol and the necessary agents of this invention.

Materials found suitable as the difunctional aromatic agents in the practice of this invention are those aromatic compounds which, in addition to possessing two functional or reactive groups such as hydroxyl, carboxyl or esters thereof, also possess a sulfonic acid group, salts or esters thereof, a sulfonamide group, or other sulfonic acid derivative which under the conditions employed in dyeing polyesters with basic dyestuffs revert to sulfonic acid or a salt thereof. Compounds of this class which have been found useful in the practice of this invention are carboxyaryl, carboalkoxyaryl, arylalkanol, acyloxyalkylaryl, and aroyl halide sulfonic acids, salts thereof, sulfonamides and the like. Useful agents of this type for use in this invention are the sodium and potassium salts of 2,5- and 3,5-dicarbomethoxybenzene sulfonic acid. Representative agents of this type include: dicarboxyaryl compounds of the general formula

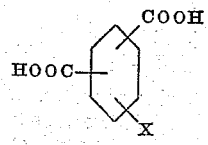

wherein X is SO₂OH, salts thereof or SO₂NH₂, such as 3,5- and 2,5-dicarboxybenzene sulfonic acid; sodium and potassium 3,5- and 2,5-dicarboxybenzene sulfonate, dicarboxybenzene sulfonamide; dicarboxynaphthalene sulfonic acid and the sodium and potassium salts thereof; dicarboxyaryl esters of the general formula

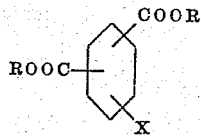

wherein R is an alkyl radical of 1 to 5 carbon atoms and X has the significance set forth above as 3,5- and 2,5-dicarbomethoxybenzene sulfonic acid; dicarboethoxybenzene sulfonic acid, dicarbopropoxybenzene sulfonic acid, dicarbobutoxybenzene sulfonic acid and potassium and sodium salts thereof; 3,5-dicarbomethoxybenzene sulfonamide, dicarbomethoxynaphthalene sulfonic acid and sulfonamide, and the potassium and sodium salts thereof; aryl dialkanols of the general formula

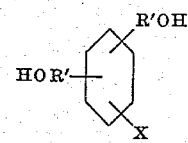

wherein R' is a polyvalent aliphatic radical such as an alkylene radical containing 1 to 10 carbon atoms and X is as above, such as 3,5- and 2,5-dibetahydroxyethylbenzene sulfonic acid, di-4-hydroxybutylbenzene sulfonic acid, and sodium and potassium salts thereof; dihydroxymethylbenzene sulfonamide, dihydroxymethylnaphthalene sulfonic acid and sulfonamide and the potassium and sodium salts thereof; esters of the aryldialkanols of the general formula

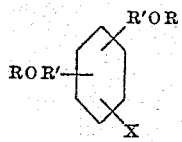

wherein R' is a polyvalent aliphatic radical such as an alkylene radical containing 1 to 10 carbon atoms, R is an acyl radical containing 1 to 5 carbon atoms, and X is as above, such as 3,5- and 2,5-diacetoxymethylbenzene sulfonic acid and sulfonamide, dibutoxymethylbenzene sulfonic acid and sodium and potassium salts thereof; 3-hydroxymethyl-5-acetoxymethylbenzene sulfonic acid and alkali metal salts thereof; diacetoxymethylnaphthylene sulfonic acid and the potassium salt thereof; compounds of the general formula which may be derived from alkylene oxides

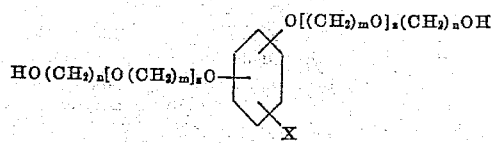

wherein $m$ and $n$ are integers from 1 to 22, $z$ is an integer from 1 to about 100 and X is as above, such as sodium di(p-omegahydroxypolyethyleneoxy)benzene sulfonate of molecular weight from about 500 to 5000, preferably 1000 to 3500 and esters thereof of aliphatic monocarboxylic acids of 1 to 5 carbon atoms; compounds of the formula

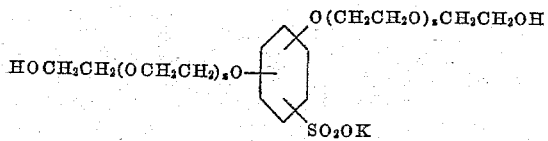

wherein $z$ is an integer from 1 to 5, and esters thereof of aliphatic monocarboxylic acids containing 1 to 5 carbon atoms; such compounds may be derived from alkylene oxides such as ethylene oxide, propylene oxide, butylene oxide, hexamethylene oxide, decamethylene oxide and the like and from mixtures thereof; dicarbonylhalidebenzene sulfonic acids and the potassium and sodium salts thereof such as 2,5- and 3,5-dicarbonylchloride benzene sulfonic acid; and the like. Also useful are mixtures of the above materials, as well as the materials represented by the general formulae

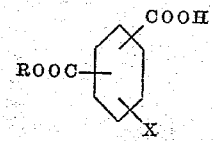

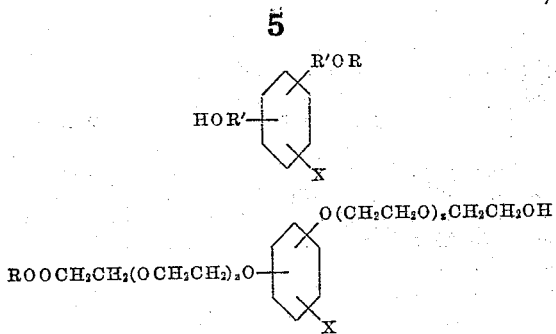

wherein $z$, $R'$, $R$ and $X$ have the significance set forth above; and the like.

Also contemplated are compounds of general formulae

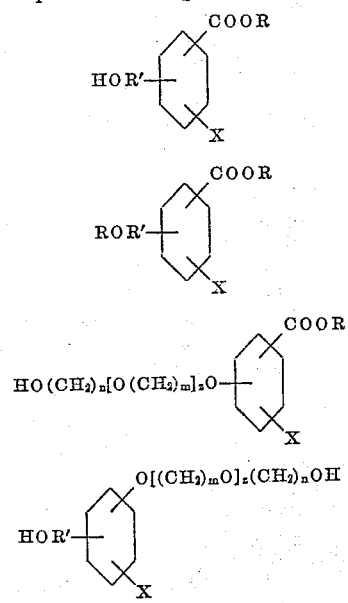

and the like wherein $R$, $R'$, $m$, $n$ and $z$ have the significance set forth above.

These useful difunctional compounds may be represented by the general formula

wherein $A$ is an aromatic nucleus such as phenyl, naphthyl, and the like; $Y$ and $Z$ are radicals selected from the group consisting of COOH, COOR wherein R is an alkyl radical containing 1 to 5 carbon atoms, R'OH wherein $R'$ is a polyvalent aliphatic radical such as an alkylene radical containing 1 to 10 carbon atoms, R'OR wherein $R'$ is a polyvalent aliphatic radical such as an alkylene radical containing 1 to 10 carbon atoms and R is an acyl radical containing 1 to 5 carbon atoms, $O[(CH_2)_mO]_z(CH_2)_nOH$ wherein $m$ and $n$ are integers from 1 to 22 and $z$ is an integer from 1 to about 100 and esters thereof having the formula

wherein R is an acyl radical of 1 to 5 carbon atoms, and X is a radical selected from the group consisting of $SO_2OH$, salts thereof, and $SO_2NH_2$. The salt of the sulfonic acid group may be any metal salt or ester of an organic reagent but more preferably are the salts of an alkali metal. These difunctional agents may be employed in amounts ranging from about 0.01 mol percent to about 5.0 mol percent, based on the amount of dicarboxylic acid or dialkyl ester thereof employed in the reaction mixture. More preferred amounts are about 0.1 to about two mol percent.

The monohydric polyalkylene oxides and hydroxyl polyalkylvinyl ethers, preferably having a terminal hydroxyl group, are essential additives for the purpose of this invention. Suitable monohydric polyalkylene oxides are those having the general formula

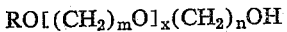

wherein R is an alkyl group containing 1 to 18 carbon atoms or an aryl group containing 6 to 10 carbon atoms, $m$ and $n$ are integers from 1 to 22, and $x$ a whole number indicative of the degree of polymerization, that is, $x$ could be an integer from 1 to about 100 or greater. As examples of substances having the above formula there may be named methoxypolyethylene glycol, methoxypolyhexamethylene glycol, methoxy-polydecamethylene glycol, methoxy polyethylenebutylene glycol, ethoxypolyethylene glycol, propoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxymethylene glycol, methoxypolyethylenepropylene glycol and the like or suitable mixtures thereof. Suitable polyalkylvinyl ethers having one terminal hydroxyl group are the addition polymers usually prepared by the polymerization of alkylvinyl ethers wherein the alkyl group contains from one to four carbon atoms. Examples of such monofunctional agents are hydroxy polymethylvinyl ether; hydroxy polyethylvinyl ether, hydroxy polypropylvinyl ether, hydroxy polybutylvinyl ether, and the like. These agents or compounds may be employed in the present invention in amounts ranging from 0.1 mol percent to about 5 mol percent, based on the amount of dicarboxylic acid or dialkyl ester thereof employed in the reaction mixture. More preferred are amounts of about 0.1 to 2 mol percent. It is understood of course that simple esters of low boiling point aliphatic monocarboxylic acids such as acetic, propionic and the like may also be used. The weight percent these monofunctional agents which are employed in this invention will vary with the molecular weight of the agent. The range of average molecular weights of these monohydric agents suitable for use in this invention is from about 500 to 5000, with those agents having a molecular weight in the range of about 1000 to about 3500 being preferred.

Additional additives employed to make the novel polyesters of this invention are the polyols which have a functionality greater than two, that is, they contain more than two functional groups as hydroxyl or esters thereof such as in pentaerythritol. Examples of such suitable compounds are compounds having the general formula

wherein R is a polyvalent aliphatic radical such as an alkyl group containing from 3 to 6 carbon atoms and $n$ is an integer from 3 to 6, for example, glycerol, sorbitol, and the like; compounds having the general formula

wherein R is a polyvalent aliphatic radical such as an alkyl group containing from 2 to 6 carbon atoms, for example, trimethylol ethane, trimethylol propane, and like compounds up to hexane; and compounds having the formula

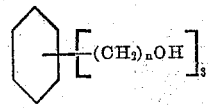

wherein $n$ is an integer from 1 to 6, including compounds of the above formula such as trimethylol benzene-1,3,5, tripropylol benzene-1,3,5, tributylol benzene-1,3,5, trihexylol benzene-1,2,6, and the like. All of the above polyols may also be used in the form of simple esters of low boiling aliphatic monocarboxylic acids containing preferably 5 or less carbon atoms such as acetic preferably, propionic and the like.

Aromatic polyfunctional acid esters may also be profitably employed in this invention in place of or in addition to the polyols particularly those having the formula

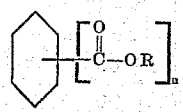

wherein $n$ may be from three to five carboalkoxy, such as methoxy, groups attached to the carbon atoms of the ring which may be any aryl compound, and the alkoxy groups preferably contain hydrocarbon radicals containing 1 to 5 carbon atoms. As examples of compounds having the above formula there may be named trimethyl trimesate, triethyl trimesate, and tripropyl trimesate, tetramethyl pyromellitate, tetramethyl mellophanate, trimethyl hemimellitate, trimethyl trimellitate, tetramethyl prehnitate, and the like. In addition, there may be employed mixtures of the above esters and esters of mixtures of alcohols. Also, in most instances, when preparing any of the compounds having the above formula, other related compounds having the same formula may be present in small amounts as impurities. This does not prevent use of the reaction product as a chain-branching agent in the practice of the present invention.

These polyols and esters may be employed in the present invention in amounts ranging from 0.01 mol percent to about 2.4 mol percent, based on the amount of dicarboxylic acid or dialkyl ester thereof employed in the reaction mixture. The preferred range of these agents for use in the present invention is from 0.1 to about one mol percent. Mixtures of the polyols and esters have been found to be valuable. The trimethyl trimesate, pentaerythritol and sorbitol are preferred agents and normally are employed in amounts from about 0.1 to 0.7 mol percent based on the mols of dimethyl terephthalate polymerized.

In the practice of the present invention, the calculated amounts of dicarboxylic acid or ester thereof, polyalkylene glycol, the defined and necessary modifiers, and catalyst, are charged to the reaction vessel. The first step or stage of the reaction normally is carried out at atmospheric pressure in an inert atmosphere as nitrogen and at a temperature in the range of about 65° to about 290° C. and preferably between about 150° and 225° C. and with from 0.001 to 1.0 percent by weight, based on the weight of the dicarboxylic acid or ester thereof, of a suitable esterification catalyst. If desired, the reaction may be carried out at pressures above or below atmospheric. When dimethyl terephthalate is used, methanol is evolved which is continuously removed by distillation. At the completion of the first stage, the excess glycol, if any, is distilled off prior to entering the second stage of the reaction.

In the second stage, the reaction is conducted at reduced pressures and preferably in the presence of an inert gas, such as nitrogen, in order to prevent oxidation. This can be accomplished by maintaining a nitrogen blanket over the reactants, said nitrogen containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of about 220° to about 325° C. This stage of the reaction may be effected either in solution, melt, or solid phase. It is understood of course that the reaction may be conducted in separate stages or continuously.

In the present invention, the first stage of the reaction takes place in approximately ¾ to 2 hours, when employing a suitable esterification catalyst. In the absence of a catalyst, longer reaction times may be necessary in order to complete this phase of the reaction. In the second stage, a reaction time of approximately 1 to 4 hours may be employed with a time of 1 to 3 hours being the optimum, depending on catalyst concentration, temperature, viscosity desired, amount of color allowable in the finished polymer, etc.

As stated above, it is generally desirable to employ a catalyst in order to speed up the reaction in both stages of the reaction. Any well known esterification catalyst may be employed such as p-toluenesulfonic acid, camphorsulfonic acid, zinc acetate, cobaltous acetate, zinc succinate, antimony oxide, and the like. However, it is preferred to employ manganous formate as a catalyst since the use of such catalyst enables the production of higher viscosity polyesters in a shorter period of time.

An important feature of this invention is that the polyethylene terephthalate is modified with the above listed agents without any substantial change in reaction conditions normally employed in making unmodified polyethylene terephthalate. This will be a readily apparent advantage from the standpoint of commercial operation.

As previously pointed out, the modifiers or agents in calculated amounts are normally added to the reaction mixture initially before the start of the first stage reaction, or are otherwise mixed with all of the ingredients before the first stage reaction is begun. Variations are contemplated and will be obvious to those skilled in the art. The modifiers also may be added in combination or singly to the other reactants in a reaction vessel during the course of the first stage or ester interchange reaction. The difunctional or polyfunctional agents which are present during the course of the ester interchange reaction will undergo either esterification or ester interchange. Ordinarily, when the modifiers and agents are added to the reaction mixture after the ester interchange reaction is completed, longer heating times may be required to adequately modify the polyester, which further heating may result in the formation of color in the polymer. In polyesters for many applications color is not a problem however.

It is understood by those skilled in the art that high molecular weight fiber-forming polyesters such as polyethylene terephthalate may be prepared directly from bis-betahydroxyethyl terephthalate by heating this reactive intermediate as described to obtain high molecular weight polyesters. The bis-betahydroxyethyl terephthalate may be prepared in a number of ways such as the reaction of ethylene carbonate with terephthalic acid, the reaction of phenyl 1,4-dicarbonylchloride with ethylene glycol, and the like, but normally is most readily obtained from dimethyl terephthalate and ethylene glycol. Polyesters from this reactive intermediate may be modified in accordance with this invention as described above particularly if ethylene glycol is included as one of the reactants, in which case the modifying agents listed hereinabove are added as such. However, reactions beginning with bis-betahydroxyethyl terephthalate may be conducted in the absence of ethylene glycol by adding at the start or during the course of the polymerization reaction esterified derivatives of the modifiers set forth above. For example, in the case of those modifiers which are esters, the modifiers may be added to the reaction in the form of the ester interchange reaction product with ethylene glycol. i.e. the bis-betahydroxyethyl esters; in the case of those which are carboxyl or hydroxyl, esters obtained from either ethylene glycol, or terephthalate or isophthalic acid, as the case may be, will be employed. For example, the ester interchange product of ethylene glycol with trimethyl trimesate and sodium or potassium 3,5-, or 2,5-dicarbomethoxybenzene sulfonate, which betahydroxyethyl esters will effectively modify the basic polyethylene terephthalate in accordance with this invention to provide improved modified polyesters having enhanced dye receptivity for dispersed and basic dyes.

The monohydric polyalkylene oxide may be employed as the ester product of these materials and terephthalic or isophthalic acid. The amounts of these products added will be equivalent to the amounts of agents set forth hereinabove. In effect, this technique involves separate preparation of the basic reactive intermediates formed when all the polyester forming reagents and modifiers are mixed and reacted together, and subsequent polymerization of these reactive intermediates. Although the process of having all of the essential ingredients present initially in the reaction mixture is the least complicated and straightforward for production purposes, the use of the described reactive intermediates and derivatives provides a modified polyester in accordance with this invention.

The modified linear condensation polyesters, produced in accordance with the present invention, have specific viscosities in the range of 0.3 to 0.6, which represent fiber- and filament-forming polymers. It is to be understood, of course, that non-fiber-forming polyesters may be produced by means of the present invention, which have a specific viscosity greater or less than 0.3 to 0.6 and such polyesters are useful, for example, in the manufacture of coating compositions, lacquers, molding compositions, and the like.

Specific viscosity, as employed herein, is represented by the formula $$N_{sp} = N_{Rel.} - 1$$

where $$N_{Rel.} = \frac{\text{Time of flow of the polymer solution in seconds}}{\text{Time of flow of the solvent in seconds}}$$

Viscosity determinations on the polymer solutions and solvent are made by allowing said solutions and solvent to flow by gravity at 25° C. through a capillary viscosity tube. In all determinations of polymer solution viscosities, a polymer solution containing 0.5 percent by weight of the polymer dissolved in a solvent mixture containing two parts by weight of phenol and one part by weight of 2,4,6-trichlorophenol, and 0.5 percent by weight of water based on the total weight of the mixture, was employed.

To further illustrate the present invention and the advantages thereof, the following specific examples are given, it being understood that these are merely intended to be illustrative and not limitative. Unless otherwise indicated, all parts and percents are by weight.

*Example I*

In this example, unmodified polyethylene terephthalate was prepared to be employed as a control or standard for comparison with the modified polyesters. A mixture or charge of 41 grams of dimethyl terephthalate, 44 ml. of ethylene glycol and 20 mg. of manganous formate was placed in a reaction vessel fitted with a distillation column and heated under a nitrogen atmosphere at approximately 178° C. for a period of 1½ hours. The methanol formed during the reaction was distilled out of the reaction vessel. After all the methanol was removed, the temperature of the reaction mixture was raised to 287° C. for a period of 30 minutes in order to remove by distillation the excess glycol in the vessel. The system was then placed under a vacuum and the pressure therein reduced to less than 1 mm. mercury while maintaining the temperature at 287° C. The polymerization was allowed to proceed for approximately 3 hours to form a polymer in the fiber-forming range which was cold-drawable. The ethylene glycol, formed during the polymerization reaction, was distilled off. The polymer melt obtained was a light straw color and filaments produced therefrom were cold-drawable.

*Example II*

A mixture consisting of 80 grams of dimethyl terephthalate, 88 ml. of ethylene glycol, 40 milligrams of manganous formate, and 2 grams of potassium 3,5-dicarbomethoxybenzene sulfonate was placed in reaction vessel equipped with a sidearm and condenser for distillation, a nitrogen inlet dip stick reaching down into the mixture, a heat source and provision for operating under vacuum. The mixture was heated to 175° C.–180° C. while slow stream of nitrogen was introduced through the dip stick for 210 minutes. The temperature of the mixture was then raised to 285° C.–290° C. and held at this temperature until the distillation of ethylene glycol was essentially complete. Pressure in the system was then reduced to less than about 1 mm. and the reaction product was heated for 3 hours at 285° C. During this later heating stage of pressure in the reactor reached about 0.1 mm. and the reaction product was kept stirred by the flow of a slow stream of nitrogen into the bottom of the reactor. The viscosity of the reaction product increased and the polymer remained essentially colorless. The reaction product was then allowed to cool and solidify to a white solid product. A high molecular weight crystalline polymer was obtained which had a specific viscosity of 0.349 and which was readily melt spun into filaments. Samples of drawn filaments were readily dyed with Amacel Violet Blue FSI, a dispersed acetate dyestuff at 212° F. for 2 hours. Drawn filaments were dyed at 250° F. under autogenous pressure with Deorlene Blue 5G, 5% owf., a basic dyestuff at pH 6. The fibers absorbed 1 percent of this dye. With both dyestuffs, the filament samples were readily dyed to useful colors in deep shades. To obtain satisfactory dyeing in reasonable times in the drawn fibers of this example with basic dyes, dyeing was conducted in a sealed vessel at a temperature of 250° F. At 210–212° F. and atmospheric pressure, the fibers were not as deeply dyed although carriers such as benzoic acid under these conditions aided in obtaining satisfactory shades. Under the conditions set forth above, fibers of the unmodified polyethylene terephthalate of Example I were only faintly stained.

*Example III*

Following the experimental procedure of Example II a mixture consisting of 58.2 grams of dimethyl terephthalate, 1.88 grams of potassium 3,5-dicarbomethoxybenzene sulfonate, 2.9 grams of methoxypolyethylene glycol of molecular weight 3000, 0.12 gram of trimethyl trimesate, 66 ml. of ethylene glycol and 30 mg. of manganous formate was polymerized as described in Example II. A high molecular weight crystalline polymer of excellent whiteness and a specific viscosity of 0.353 was obtained. The polymer was readily melt spun to single filament fibers which were machine drawn to a 5.1 draw ratio. The single filament fibers had a tenacity of 3.7 g./d. at 16 percent elongation. Samples of these filaments were readily dyed to a deep shade of blue in a dyebath containing 10 percent owf. of Amacel Violet Blue FSI at 210–212° F. Filaments of this polymer were also rapidly dyed to deep shades with the basic dye Sevron Blue B in a dyebath containing 10 percent owf. of the dye at 210–212° F. The fibers absorbed 3.1 percent of the basic dye based on the weight of the fiber. The dyed fibers had excellent fastness.

A readily dyeable modified polyester is obtained by heating together as described in Example II, a mixture of bis-betahydroxyethyl terephthalate, ethylene glycol, methoxypolyethylene glycol, trimethyl trimesate and manganous formate in the amounts equivalent to the starting materials set forth above.

A modified polyester is also readily obtained by heating a mixture of bis-betahydroxyethyl terephthalate, potassium 3,5-dicarbobetahydroxyethoxybenzene sulfonate, tribetahydroxyethyl trimesate, methoxypolyethylene glycol of molecular weight 1500 to 3000 of the esterification reaction product of dimethyl terephthalate and methoxypolyethylene glycol, and manganous formate, at about 300° C. for 3 hours at a pressure less than 1 mm. The resulting polymer in fiber form is cold drawable and is readily dyed with the dyes of Example III.

When Example III above is repeated with other of the defined agents and in the amounts set forth hereinbefore, similar excellent results are obtained. For example the potassium 3,5-carbomethoxybenzene sulfonate may be replaced with sodium 3,5-carbomethoxybenzene sulfonate, potassium 2,5-carbomethoxybenzene sulfonate, potassium phenyl-3,5-dibetaethanol sulfonate and the acetic acid ester thereof, potassium dicarboethoxybenzene sulfonate, sodium 3,5-di(omegahydroxypolyoxyethyleneoxy)benzene sulfonate of molecular weights of 1500 to 3000, and the like to obtain excellent modified polyesters. Potassium and sodium 3,5- and 2,5-dicarboxybenzene sulfonate may be used if a strong acidic catalyst such as sulfuric acid and longer reaction times are employed. Useful modified polyesters are also obtained when sorbitol, pentaerythritol, glycerol, acetic acid esters thereof and the like are employed in amounts, for example from 0.1 to 1.0 mol percent, in place of or in addition to trimethyl trimesate. Likewise, other methoxypolyethylene glycols, ethoxypolypropylene glycols, hydroxypolyethylvinyl ether, acetic acid esters thereof and the like, of molecular weights from 1500 to 3000 in amounts from about 0.1 to 1.0 mol percent are readily substituted in part or wholly for the methoxypolyethylene glycol of Example III to provide improved polyesters of ready dyeability by basic dyes. Use of hydroxypolymethylvinyl ethers of molecular weight 800 in place of the methoxypolyethylene glycol also result in a readily dyeable polyester.

In each case, modified polyesters are obtained which are readily formed into filaments which are dyed to satisfactory shades with both dispersed and basic dyes by conventional techniques, such filaments having in addition, excellent physical properties. Likewise, excellent improvement in dye receptiveness of polyesters from dialkyl esters of isophthalic acid and other polymethylene glycols is obtained.

As is obvious, this invention is particularly applied to the modification of high molecular weight polyethylene terephthalates. The modified polyesters and copolyesters of this invention have a different structure from that of unmodified polyesters. However, this change in polymer structure does not affect the desirable properties found in the unmodified polymers and at the same time improved dye receptiveness is obtained. It will be understood, that although not essential, higher temperatures than 210–212° F., higher pressures, and carriers such as p-phenylphenol and benzoic acid may be employed with the improved modifitd polyesters of this invention if desired. The advantages of the improved polyesters of the invention will be readily seen by those skilled in the art.

As shown, the modified polyesters and copolyesters made in accordance with the present invention show increased dye-receptivity and are more readily dyeable by commercial techniques than is unmodified polyethylene terephthalate. They are particularly readily dyed with that class of dyestuffs known to the trade as the dispersed acetate type dyes at 210–212° F. and atmospheric pressure. Examples of dispersed acetate dyestuffs which can be used to dye the modified terephthalate polymers are: Acetamine Orange GR. Conc. 175% (Pr. 43), Celanthrene Fast Yellow GL. Conc. 300% (Pr. 534), Celanthrene Brilliant Blue FFS Conc. 200% (Pr. 228), Celanthrene Fast Pink 3B (Pr. 235), and the like.

The modified polyesters are also readily dyed with basic dyes at 210–212° F. and atmospheric pressure. Such basic dyes include Sevron Yellow L and 3RL; Genacryl Yellow 3G and Orange R; Deorlene Brilliant Red 3B and Blue 5G; Sevron Brilliant Red 4G and Red L, Blue 2G and Blue B; Fuchsine N Concentrate; Victoria Green S Ex. Conc.; and the like.

This invention provides the textile art with novel and improved modified polyesters, which modified polyesters retain the physical properties required for filaments thereof in textile applications, and which are readily dyed by conventional techniques with both dispersed and basic dyes to deep and useful shades of color.

I claim:

1. A method for producing fiber-forming modified polyesters which comprises mixing together (1) a compound selected from the group consisting of aromatic dicarboxylic acids in which the aromatic nucleus is substituted only with carboxyl groups and alkyl esters of said acids wherein the alkyl radical contains 1 to 5 carbon atoms, (2) at least one mol and up to ten mols of HOROH per mol of (1) wherein R is an alkylene radical of 2 to 10 carbon atoms; (3) from 0.1 to about 5.0 mol percent based on the weight of (1), a chain-terminating compound selected from the group consisting of (a) monohydric polyalkylene oxides having a general formula selected from the group consisting of R—O[(CH$_2$)$_m$O]$_z$(CH$_2$)$_n$—OH and R—O[(CH$_2$)$_m$O]$_z$(CH$_2$)$_n$—OR', wherein R is selected from the group consisting of alkyl groups containing 1 to 18 carbon atoms and aryl groups containing 1 to 10 carbon atoms, R' is an acyl radical containing 1 to 5 carbon atoms, m and n are integers from 1 to 22, and z is an integer from 1 to about 100, (b) hydroxyl polyalkylvinyl ethers having a terminal hydroxy group wherein the alkyl group contains 1 to 4 carbon atoms, said ethers having molecular weights from about 500 to 5000, and (c) acyl esters of said polyalkylvinyl ethers having a terminal hydroxy group wherein the acyl radical contains 1 to 5 carbon atoms; (4) about 0.01 to about 2.4 mol percent based on the weight of (1), a chain-branching agent selected from the group consisting of (a) compounds having the general formula: R(OH)$_n$ wherein R is a polyvalent saturated aliphatic hydrocarbon radical containing 3 to 6 carbon atoms and n is an integer from 3 to 6, (b) acyl esters of the (4a) compounds wherein the acyl radicals contain 1 to 5 carbon atoms, (c) compounds having the general formula: R(CH$_2$OH)$_3$ wherein R is a polyvalent aliphatic hydrocarbon radical containing 2 to 6 carbon atoms, (d) acyl esters of the (4c) compounds wherein the acyl radicals contain 1 to 5 carbon atoms, (e) compounds having the general formula:

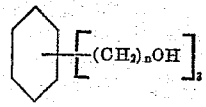

wherein n is an integer from 1 to 6, (f) acyl esters of (4e) compounds wherein the acyl radicals contain 1 to 5 carbon atoms, and (g) compounds having the general formula:

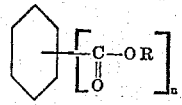

wherein n is an integer from 3 to 5 and R is an alkyl radical containing 1 to 5 carbon atoms; and (5) from about 0.01 to about five mol percent based on the weight of (1) an aromatic compound of the general formula:

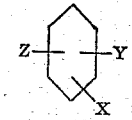

wherein X is selected from the group consisting of —SO$_2$OH, —SO$_2$NH$_2$ and —SO$_2$OM wherein M is an alkali metal, and Y and Z are radicals selected from the group consisting of —COOH, —COOR wherein R is an alkyl radical containing 1 to 5 carbon atoms, —R'OH wherein R' is an alkylene radical containing 1 to 10 carbon atoms, —R'OR" wherein R' is an alkylene radical containing 1 to 10 carbon atoms and R" is an acyl radical containing 1 to 5 carbon atoms, —O[(CH$_2$)$_m$O]$_z$(CH$_2$)$_n$OH and —O[(CH$_2$)$_m$O]$_z$(CH$_2$)$_n$OR" wherein m and n are integers from 1 to 22, z is an integer from 1 to about 100 and R" is an acyl radical of 1 to 5 carbon atoms and heating the resulting mixture at a temperature in the range of from 65° C. to about 325° C. until the resulting polymer attains a specific viscosity in the range of about 0.3 to 0.6.

2. The method of claim 1 where (1) is dimethyl terephthalate, (2) is ethylene glycol, (3) is methoxypolyethylene glycol of a molecular weight of about 1500 to 3000, (4) is trimethyl trimesate, and (5) is potassium 3,5-dicarbomethoxybenzene sulfonate.

3. The method of claim 2 where (5) is sodium 3,5-dicarbomethoxybenzene sulfonate.

4. The method of claim 1 where (1) is dimethyl terephthalate, (2) is ethylene glycol, (3) is methoxypolyethylene glycol of a molecular weight of about 1500 to 3000, (4) is sorbitol, and (5) is potassium 2,5-dicarbomethoxybenzene sulfonate.

5. The method of claim 1 where (1) is dimethyl terephthalate, (2) is ethylene glycol, (3) is ethoxypolypropylene glycol of a molecular weight of about 1500 to 3000, (4) is pentaerythritol, and (5) is potassium 3,5-dicarbomethoxybenzene sulfonate.

6. Modified polyesters prepared by the method of claim 1.

7. Modified polyethylene terephthalate prepared by the method of claim 1.

8. Cold-drawable polyester filaments made from the polyesters prepared by the method of claim 1.

9. The method of claim 1 where (1) is dimethyl terephthalate, (2) is ethylene glycol, (3) is methoxy polyethylene glycol of a molecular weight of about 1500 to 3000, (4) is pentaerythritol, and (5) is potassium-3,5-dicarbomethoxy benzene sulfonate.

References Cited in the file of this patent

UNITED STATES PATENTS

| | | |
|---|---|---|
| 1,935,264 | Felix | Nov. 14, 1933 |
| 2,028,091 | Jaeger | Jan. 14, 1936 |
| 2,056,656 | Ellis | Oct. 6, 1936 |
| 2,138,934 | Moss | Dec. 8, 1938 |
| 2,244,192 | Flory | June 3, 1941 |
| 2,744,087 | Snyder | May 1, 1956 |
| 2,895,946 | Huffman | July 21, 1959 |

FOREIGN PATENTS

| | | |
|---|---|---|
| 713,082 | France | Oct. 21, 1931 |
| 5,135 of 1895 | Great Britain | Jan. 11, 1896 |
| 549,179 | Belgium | July 14, 1956 |